UNITED STATES PATENT OFFICE.

FRIEDRICH CARL HEYER, OF SCHLEBUSCH-MANFORT, GERMANY, ASSIGNOR TO E. I. DU PONT DE NEMOURS POWDER COMPANY, OF WILMINGTON, DELAWARE, A CORPORATION OF NEW JERSEY.

PROCESS OF PURIFYING MONOCHLORHYDRIN.

1,040,323.      Specification of Letters Patent.      Patented Oct. 8, 1912.

No Drawing.      Application filed May 13, 1910. Serial No. 561,029.

*To all whom it may concern:*

Be it known that I, FRIEDRICH CARL HEYER, a subject of the Emperor of Germany, residing at Schlebusch-Manfort, Germany, have invented a new and useful Improvement in Processes of Purifying Monochlorhydrin, of which the following is a full, clear, and exact description.

The production of monochlorhydrin by the action of chlorinated sulfur upon glycerin (see German Patent No. 201,230) is known in the art. According to this patent, a direct nitration may be carried out in case the chlorinated material is to be used for explosive purposes, or the monochlorhydrin may be separated from the glycerin by fractional distillation. It is found advantageous to further purify the chlorinated material before nitrating or distilling the same and to effect the removal of the resinification products and other impurities that have been produced. This purification may be accomplished to a sufficient degree by treating the chlorinated material with animal charcoal or with similar substances, but this method is objectionable because of both its inconvenience and its expense. It has also been attempted to free the chlorinated material from the separated sulfur by pressing or by suctional filtration, or by filtering the same otherwise and obtaining the remainder by washing the sulfur with hot water. As the sulfur is obtained in granular form containing lumps as large as hens' eggs, it is necessary to finely pulverize the sulfur before it is washed. Notwithstanding this, a complete separation of the chlorinated material by the above method is very difficult, and the sulfur available is not sufficiently pure to render its direct use possible, as it contains water, residues of the chlorinated material, resins, sulfur oils, etc., in quantities as high as fifteen per cent.

The objects of my invention are: First, to substantially free the chlorinated material from the by-products that it contains by convenient and inexpensive means; and second, to substantially free the separated sulfur from impurities and permit it to be used directly and at the same time to completely separate therefrom the chlorinated material.

In carrying out my invention, I dilute the crude chlorinated product with water, preferably about two volumes of water to one volume of the chlorinated product, then permit the resins, sulfur, etc., to settle and remove the same, or separate the same by filtration, then (if desired) decolorize the clear liquid thus obtained by means of animal charcoal or other similar substances, and then concentrate the same for a prolonged time in a vacuum at a temperature of from 40° to 100° C. to liberate the clear liquid from water, hydrochloric acid, dichlorhydrin and other impurities that are present in solution. It will be understood that the removal of the solid materials by filtration and their removal by settlement are equivalent steps, and that in specifying one step in the claims, I do not mean to exclude the other step as an equivalent.

The separated sulfur, together with the chlorinated material adhering to same, are heated to a temperature of about 120° C. The sulfur melts and the chlorinated material which possesses a lower specific gravity, rises to the top, and can be either skimmed off or allowed to flow off into a separate receptacle. The sulfur thus obtained is free from water and contains only small quantities of organic impurities. The separated chlorinated material thus obtained may be purified in the same manner as the bulk of the product.

The degree of vacuum employed is about 70 mm. It is not desirable to work with a pressure higher than 60–70 mm. on account of the higher temperature. The lowest possible pressure is the most effective. The time required for vaporization is about sixteen hours for 100 kg. of the finished product, but the time will vary with the apparatus and method of operation employed. The preferred density of the evaporated liquid is 1.10 to 1.11–13° to 15° Bé.

If it is desired to decolorize (which is no essential feature of my process in its broadest aspect) the liquid liberated from the bulk of the dissolved resins by means of dilution is diluted with not less than 1–2% animal charcoal, heated for about one-half hour under stirring to about 70°, permitted to stand for some little time and is then later filtered. The animal charcoal is, depending upon its quality, treated preliminarily.

The same is first washed with caustic lye (a treatment which is not absolutely necessary), then with water, then with a mixture of hydrochloric acid and fluorhydric acid, and finally with large quantities of water. The same is then dried and glowed.

Having now fully described my invention, what I claim and desire to protect by Letters Patent is:—

1. The process of purifying the chlorinated product obtained by the action of chlorinated sulfur upon glycerin, which consists in diluting the same with water, removing the sulfur and other material that may be removed by filtration, and then removing the water, hydrochloric acid and dichlorhydrin by subjecting the clear liquid thus obtained to prolonged heating in a vacuum at a temperature of between 40° and 100° C.

2. The process of purifying the chlorinated product obtained by the action of chlorinated sulfur upon glycerin, which consists in diluting the same with water, removing the sulfur and other materials that may be removed by filtration, decolorizing the clear liquid thus obtained and subjecting it to prolonged heating in a vacuum at a temperature of between 40° and 100° C.

3. The process of purifying the chlorinated product obtained by the action of chlorinated sulfur upon glycerin, which consists in diluting said product with water, removing the sulfur and other materials that may be removed by filtration, heating the sulfur and the chlorinated material adhering thereto to a temperature sufficiently high to melt the sulfur, removing the chlorinated material which is separated above the molten sulfur, and subjecting the clear liquid remaining after removal of the sulfur, and also the chlorinated material separated from the sulfur, to prolonged heating in a vacuum at a temperature between 40° and 100° C., thereby removing water, hydrochloric acid and dichlorhydrin.

In testimony of which invention, I have hereunto set my hand, at Cologne, on this 22 day of April, 1910.

FRIEDRICH CARL HEYER.

Witnesses:
JACOB VON HERKEN,
T. G. FRITZ EMONS.